United States Patent [19]

Cook, Jr.

[11] Patent Number: 4,505,062
[45] Date of Patent: Mar. 19, 1985

[54] LONGLINE HAULING AND STOWAGE APPARATUS

[75] Inventor: Harold T. Cook, Jr., Bainbridge Island, Wash.

[73] Assignee: Marine Construction & Design Co., Seattle, Wash.

[21] Appl. No.: 405,345

[22] Filed: Aug. 5, 1982

[51] Int. Cl.³ .............................................. A01K 91/00
[52] U.S. Cl. ......................................................... 43/6.5
[58] Field of Search ................... 43/6.5, 4, 4.5, 27.4

[56] References Cited

U.S. PATENT DOCUMENTS

| | | | |
|---|---|---|---|
| 3,903,632 | 9/1975 | Tison | 43/27.4 |
| 4,107,865 | 8/1978 | Alex | 43/4 |
| 4,250,648 | 2/1981 | Jacobsen | 43/27.4 |
| 4,266,359 | 5/1981 | Alex | 43/6.5 |

Primary Examiner—Gene P. Crosby
Attorney, Agent, or Firm—Christensen, O'Connor, Johnson & Kindness

[57] ABSTRACT

Apparatus for stowing longline for resetting while hauling the longline, in which the hooks are successively captured by a cooperating entry brush and opposing guide track surface so as to be advanced in controlled succession along the track by a hauler engaging the longlines ground line and preferably comprising a V-groove, power-driven sheave. Opposing transverse rollers angled to line advancement at the discharge side of the sheave feed the ground line to stowage, while the captured hooks are drawn by their gangions into successively nested positions on an associated section of guide track ready for inspection, replacement and/or subsequent orderly release during resetting of the longline.

43 Claims, 6 Drawing Figures

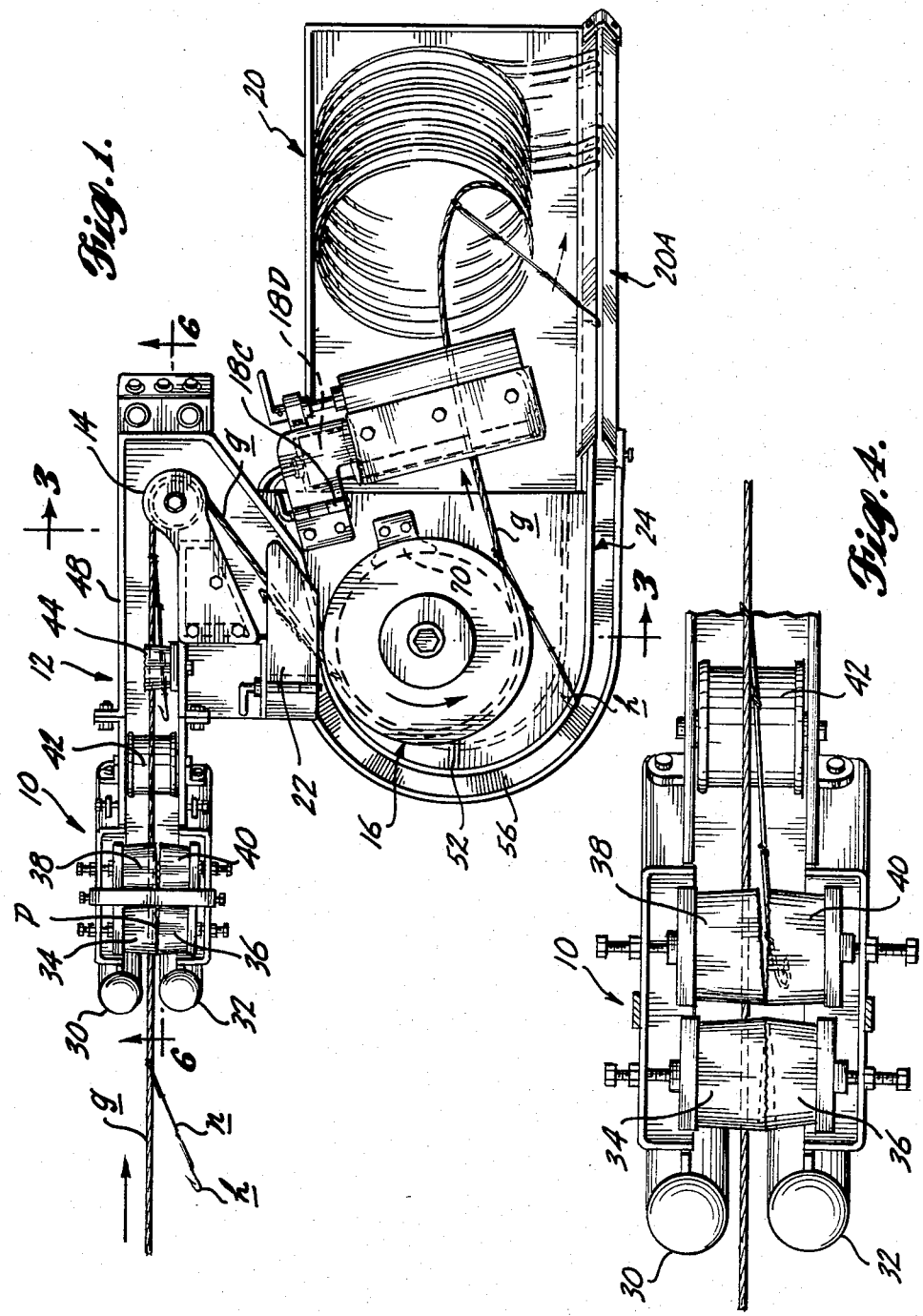

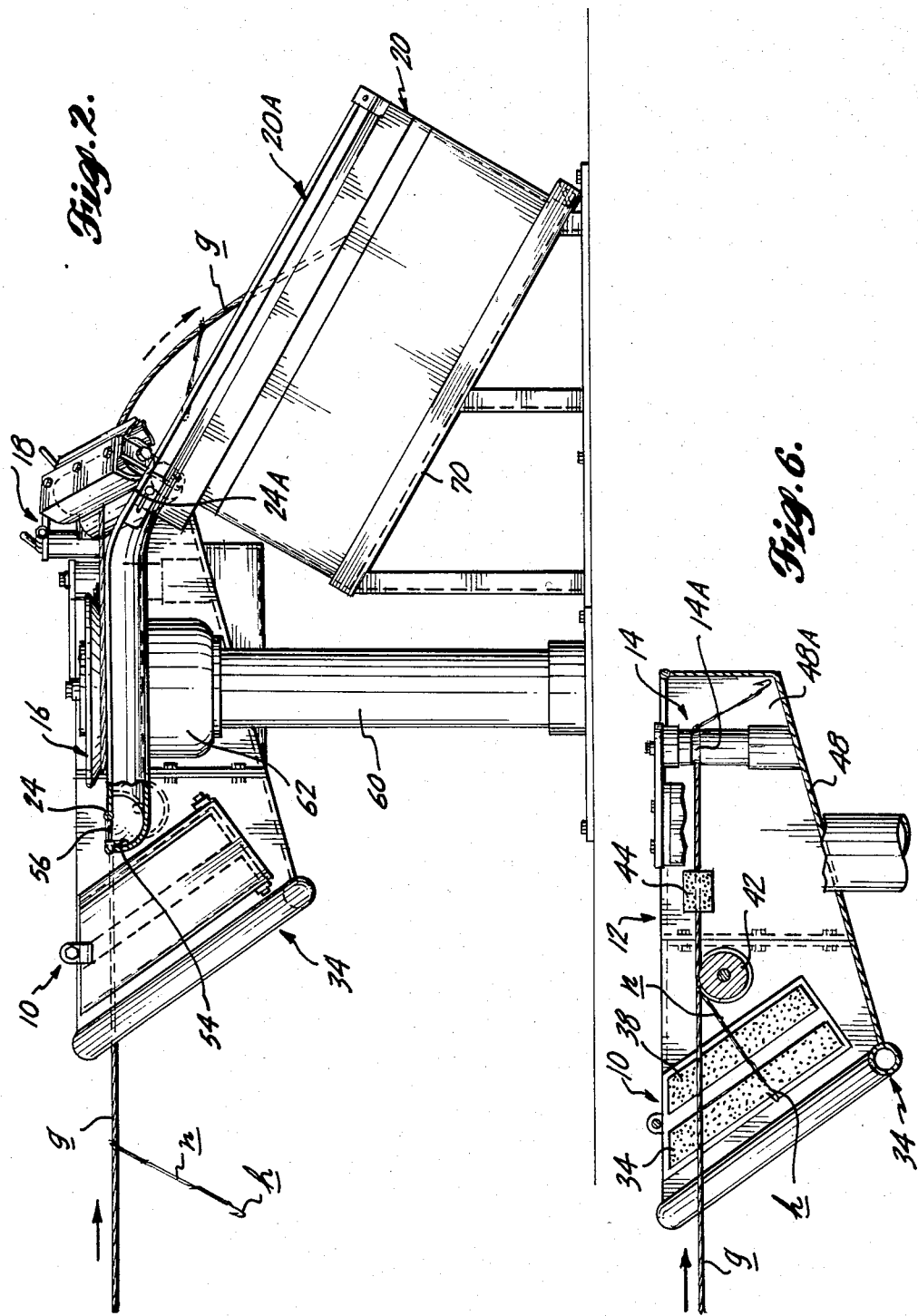

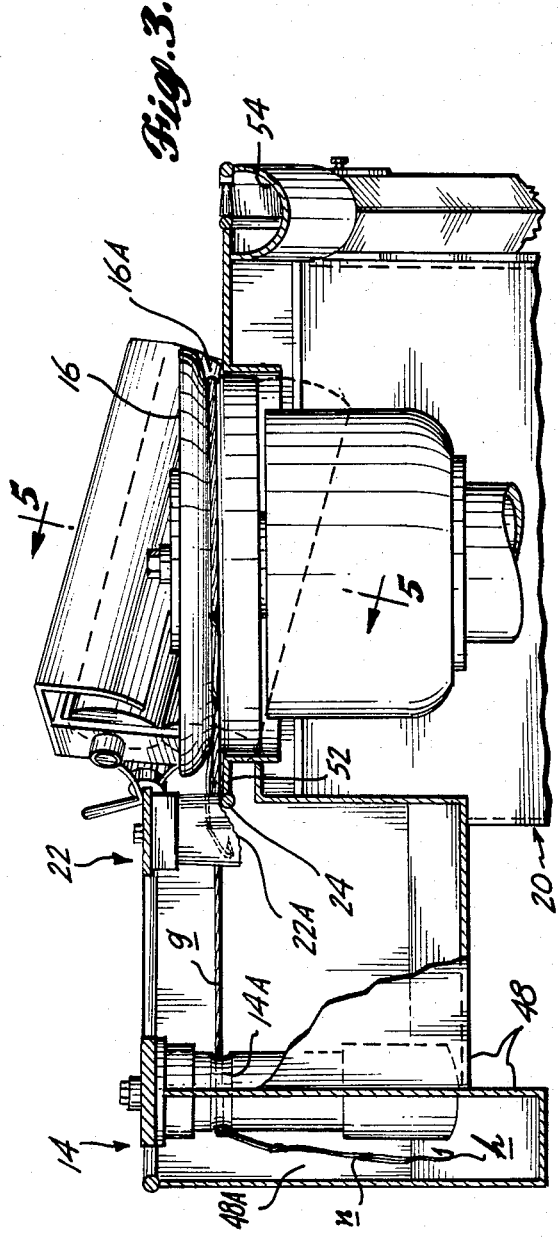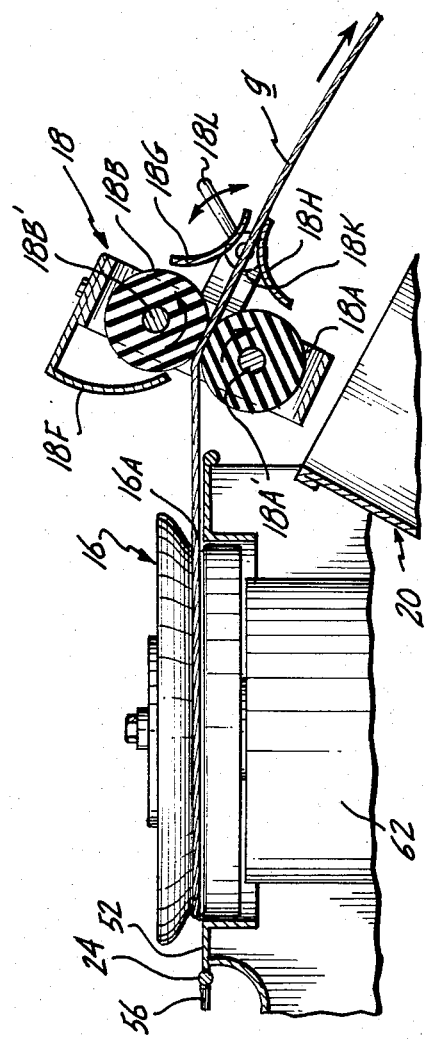

LONGLINE HAULING AND STOWAGE APPARATUS

BACKGROUND OF THE INVENTION

This invention relates to improved longline hauling and stowage apparatus useful in bottom fishing. The invention provides an improved mechanized hauler that stows the hooks, gangions, and ground line in an orderly manner, as in Alex U.S. Pat. No. 4,266,359, and that permits subsequent mechanized baiting and resetting of the longline. In the interim, the stowage arrangement provides direct access to the hooks and gangions for inspection and needed repair. The invention is herein illustratively described by reference to its presently preferred form; however, it will be appreciated that certain modifications and changes therein may be made with respect to details without departing from the essential features involved.

Various mechanized longline haulers and stowage devices have been contrived heretofore in an effort to reduce the labor and to speed up the process of hauling and resetting these lines. Most prior proposals addressed to the practical needs of the fishermen were overly complex and expensive or fell short in one or more functional aspects, such as stowing the longline components not only in an orderly fashion for resetting, but in such a way as to make it convenient for the fishermen to inspect the condition of this gear and to make needed repairs therein, such as replacing gangions or hooks, retying gangion-to-ground line knots, etc. The above-mentioned Alex patent discloses a longline stowage container and hook retention apparatus directed to such objectives. The present invention is directed to an improved hauler for use with a longline stowage means such as that disclosed in said Alex patent and, more particularly, concerns a simple, safe and reliable longline hauler apparatus which is also compact in form and readily suited to the space accommodations available on most standard bottom fishing vessels.

Other objectives of the invention include providing a hauler which will accommodate differences in diameter of ground line, differences in hook size, and differences in gangion lengths and knot sizes. Moreover, the apparatus continues to function, usually without interruption, despite tangled gangions or gangions partially wrapped around the ground line. It also continues to function when occasional individual incoming hooks become so oriented that they are not picked up by the hauler hook guide so as to be led properly into the stowage means guide track.

Still another object hereof is to provide a simplified and effective sheave-type hauler and, in association with it, a line stowage bin and an effective means operating between the sheave and the bin for drawing the ground line from the hauler sheave and continuously casting the ground line into the bin in an orderly arrangement of stacked loops or coils while concurrently accelerating the successive gangions in their turn along a guided approach into stacked relationship on a guide track extending along a side rim of the bin. Here, simplicity, compactness and effective, trouble-free operation represent important objectives.

SUMMARY OF THE INVENTION

Longline entering the apparatus passes initially through means to remove fish and most of the residual bait pieces from the hooks by squeezing and brushing or scraping them off, and means to unwind gangions from the ground line if wrapped around it. The ground line then is drawn into a V-groove hauler sheave. Wedging itself under hauling tension into the sheave groove and extending around a major arc (a third to a half) of the sheave, the ground line develops sufficient traction on the surfaces of the power-driven sheave for hauling. It is thereupon pulled from the sheave groove by transfer rolls that cast it in an orderly succession of loops and coils down into a stowage bin placed beyond and beneath the rolls and preferably of the type disclosed in Alex U.S. Pat. No. 4,266,359.

Hooks drawn by their gangions into the hauler mechanism pass through an orienting means comprising the bristles of a brush positioning and pressing the hooks into sliding engagement with a curved guide track lying generally in the groove plane of the hauler sheave, extending around a peripheral arc of the hauler sheave and lying in a path that spirals slowly outward from the sheave and finally straightens into alignment with a hook stacking guide track extending along one rim of the stowage bin. The path divergence created between the ground line advancing around the hauler sheave to enter between the transfer rolls and the hooks being drawn by the ground line along the guide track in an outward spiral assures not only the maintaining of gangion tension, but an accelerating action carrying the hooks into nested relationship along the rim guide track of the stowage bin.

A steadying drag on the hooks maintained by a brush extending along the length of the guide track to the vicinity of its mergence into the aligned bin track, and with the brush teminating short of the latter track, provides a consistency to the action.

The adaptability of the hauler to accommodate knots, tangles, and other parameter variations while functioning consistently during hauling is further enhanced by radial width foreshortening of the lower flange of the hauler sheave and by filling the spirally widening gap between its edge and the hook guide by a horizontal support table for the advancing gangions and for any hooks on the gangions that may not have caught the guide track on their approach. The transfer rolls are angled downwardly from their cantilever support ends above the plane of the hauler sheave groove to their open free ends extending below that plane, and they are oriented with their nip line angled downpath from the normal to the final run of the hook guide track so as to help maintain the aforesaid path divergence. The upper roll is mounted to yield upwardly when line bulges seek to pass. The lower roll is power driven, but it is driven with limited torque to as to draw the ground line from the hauler sheave but without material slippage and scouring of the roll surfaces by the ground line should it fail to pull readily out of the groove. (A line splitter further along the groove stands by to extract the ground line on those occasions.) The stowage bin, including its rimedge hook guide tracks, is mounted at a downward incline beyond and beneath the transfer rolls' station. The upper roll is offset horizontally toward the bin from the lower roll. The effect is to combine the directional casting action of the transfer rolls, hook/gangion acceleration, as previously described, and gravity itself to carry the longline components into their final positions.

These and other features, aspects, and advantages of the invention will become more fully evident as the description proceeds by reference to the accompanying drawings.

BRIEF DESCRIPTION OF THE DRAWINGS

FIG. 1 is a plan view of the improved hauler apparatus, including means for removing bait from the hooks and means also ahead of the hauler sheave for straightening tangled or enwrapped gangions.

FIG. 2 is a side elevation view of the apparatus shown in FIG. 1.

FIG. 3 is a sectional view taken on line 3—3 in FIG. 1.

FIG. 4 is an enlarged top view of the debaiter and gangion straightening means at the entrance of the hauler.

FIG. 5 is a sectional view taken on line 5—5 in FIG. 3.

FIG. 6 is a transverse sectional view taken on line 6—6 in FIG. 1.

DETAILED DESCRIPTION REFERRING TO DRAWINGS

During longline hauling, the incoming ground line g with its series of gangions n carrying hooks h is advanced first through the fish and bait removal unit 10, then through means 12 by which gangions that may still be enwrapped around the ground line are at least partially unwound from it. After rounding the direction-changing guide roller 14, the ground line, under hauling tension produced by driven rotation of hauler sheave 16, enters the groove of the sheave and extends around a major arc of the sheave (approaching 180° of arc) wedged into the groove over that arc to gain drive traction on the ground line. Pulled normally from the sheave through the nip of elongated parallel transfer rolls 18, the lower one of which is power driven, the ground line g is cast by such rolls at a downward angle (FIG. 5) into a line stowage bin 20 lying beyond and beneath the level of the roller set 18, carrying the gangions with the ground line and drawing the hooks into nested relationship on the bin's rim-edge guide track 20A.

As the ground line g approaches, passes around and is drawn from the hauler sheave 16 by the transfer rolls 18, the hooks h are steadied and guided along a path defined by track 24. Track 24 extends between guide roller 14 and stowage bin guide track 20A. In approaching guide track 24, the advancing gangions first encounter a stabilizing and hook-orienting means 22 causing the hooks to catch and enter sliding engagement with the guide track 24. Drawn along that track by advancement of the ground line around the hauler sheave 16, the hooks progress until coming to rest in successively nested positions on the stowage bin rim-edge hook guide track 20A.

The illustrated unit 10 for removing fish and most of the larger pieces of bait residual remaining on the hooks when the longline is hauled includes the smoothly rounded, mutually parallel, transversely spaced sides 30 and 32 of an upwardly open, U-shaped entrance guide 34 formed of tubular stock. Guide 34 defines an elongated, narrow, upright entrance sloped downwardly from the generally horizontal stretch of ground line at about 60° in the direction of hauling motion. The sides 30 and 32 are spaced apart sufficiently to pass the ground line with its knots, gangions and hooks, but not to pass fish and most larger chunks of bait or debris on the hooks. After clearing the inclined entrance guide 34, the hooks are drawn by the advancing ground line successively through two sets of elongated, opposing brushes inclined parallel to guide 34 that function primarily to remove bait remnants from the hooks. The bristles of brushes 35 and 36 of the first set extend horizontally toward each other with tips overlapping and intermeshing beyond a vertical interface or median plane p that is offset horizontally from the median or average plane of advancement of the ground line g through the gap between entrance guide members 30 and 32. The same positioning applies to the succeeding second set of opposing brushes 38 and 40, except for the essential absence of overlap of opposing sets of bristles in the second set. It is found that this horizontal median plane offset improves the action of the brushes in cleaning the hooks as compared with the action achieved if their bristles intermesh on a median plane central to the line passage between the guide members 30 and 32. It will be appreciated that the brushes referred to have stiff nylon bristles, or equivalent, stiff in the sense of producing a strong wiping or scraping action on hooks passing between the sets of bristles. As shown best in FIG. 4, the respective bristle tip planes of the opposing brushes 35 and 36 are angled toward each other in the direction of line advancement so as to produce overlap of bristles by an amount that diminishes in the direction of line advancement. In the second brush set, 38 and 40, the bristles terminate substantially in a common median plane at the leading edge, but are shortened progressively to form a widening gap between their terminal planes away from the leading edge. This configurational relationship of the sets of brushes helps minimize snap action release of the gangion hooks leaving the resilient bristles under the force of gangion tension.

The ground line passes next over a guide roller 42 positioned to rotate on a horizontal axis substantially at the level at which the ground line g enters and passes between the sets of brushes (FIG. 6). Thereafter, the ground line passes through the bristles of a succeeding brush 44 mounted on one side of the line path. The bristles of this brush are also stiff, yet not so much so as to damage the line components. Brush 44 further unwinds any gangions still enwrapping the ground line after emerging from the brushes of the first and second sets.

Upon leaving brush 44, the ground line passes around elongated, upright, cylindrical guide 14, normally at a level established by peripheral groove 14A in the roll surface. Groove 14A is approximately at the level of the topside of the guide roller 42. The surrounding and underlying space in housing enclosure 48 permits the gangions to swing freely and without obstruction or restriction. The change of ground line direction executed in traversing the guide roller 14 is approximately 300° in the preferred apparatus configuration. This folds the advancement path of the ground line g back upon itself so that the desired length of path is afforded for the gangions to trail the ground line from roller 14 into the hook orientor (about to be described) without unduly widening the apparatus at the expense of preempting otherwise useful or unavailable deck area of the fishing vessel. At normal hauling rates, the gangions suspended from the ground line in executing the turn around the guide roller 14 tend to angle back from their points of fastening to the ground line and to swing outwardly by centrifugal force in rounding the guide roller 14. The clearance space afforded around the roller and beneath its line groove 14A accommodates this motion path of the hooks, sparing them from undue contact with housing surfaces or corners and protecting personnel.

The gangions, following the ground line in its straight stretch extending from guide roller 14 to the hauler sheave 16, are drawn forwardly with the ground line into oblique incidence (viewed in plan) upon and over the initial portion of a hook guide track 24. In so doing, the gangions pass through the downwardly projecting bristles of an elongated, horizontally disposed brush 22. These stiff nylon, or equivalent, bristles extend downwardly at the leading edge of the brush to a level well below the top level of the hook guide track 24 which, in turn, lies substantially in the horizontal plane of the base of the V-shaped groove 16A in hauler sheave 16. The tip plane of the bristles rises, however, in the direction of line advancement, and does so substantially to the top level of track 24 overlapped by the brush (FIG. 3) so as not to be caught by the hooks and deflected over the top of guide track 24 and held in that position by the track. The advancing gangions, and thereby the shanks of the gangion hooks are thereby forced to pass through this array of bristles in order to pass over the track 24 by advancement of the ground line tangentially toward the hauler sheave groove. The hooks thereby encounter drag forces and hook-orienting forces from the brush that help in conjunction with the oblique incidence of the gangions on track 24 to lead the hooks into the desired sliding engagement with the rounded smooth surface of guide track 24. Tips of the brush bristles press gangions against the guide track as they advance upon it in order to keep those gangions which hang down over the guide track from sliding along the length of the guide track, drawn as they are by ground line advancement, in lieu of being drawn upwardly over the guide track until their respective hooks are captured by the guide track. Because of the acute angle of the guide track to the approaching stretch of ground line where the two first intersect, there is that tendency for the gangions to slide along the guide track as indicated without the drag resistance to such motion the gangions receive from the brush. However, that acute angle intersection relationship is necessary at the location where the hooks are to be captured, as opposed to having the guide track at right angles, for example, to the ground line in such region, inasmuch as free sliding advance of the hooks drawn along the guide track is necessary once they are captured. While the brush bristles do not prevent such free advancement of the captured hooks, they perform a function in assuring that such capture takes place.

As shown best in FIG. 5, hauler sheave 16 has a V-groove 16A, but the lower flange of the sheave is removed except for the portion defining the base portion of what would otherwise be a full V-groove. The base portion nevertheless constitutes an adequately deep V-groove into which the ground line is wedged for tractional engagement around the working arc of the hauler sheave. At a level flush with the bottom or lower portion of the V-groove 16A and lying in close proximity to the periphery of the hauler sheave at that level, a horizontal table 52 extends outwardly therefrom around the hauler sheave and, at its outer edge, is provided with a transversely rounded bead that serves as the hook guide 24. In the event a hook is not caught on the guide 24 so as to be retained slidably on the guide, it will nevertheless, with its gangion, slide over and along the horizontal top surface of the table 52 as the ground line advances around the hauler sheave. A catcher trough 54 underlies the hook guide 24 to catch pieces of bait and other debris that may have still been clinging to the hooks. Its outer edge mounts a continuous steadying brush or brush series 56 that projects radially inwardly into substantial contact with the outer edge surface of hook guide 24 along substantially the full length of the guide between the hook-orienting brush 22 and the exit of the guide 24 where it merges into the aligned stowage bin hook track 20A. Brush 56 maintains the hooks in stable sliding and guided contact with the hook guide 24 as the hooks are drawn along its length by the slight gangion tension required to keep the gangions straight and the guidance smooth and stable.

Preferably, the radial distance between the hook guide 24 and the perimeter of the hauler sheave 16 (minimized by shortening the sheave's lower flange so as to reduce any tendency for wrapped gangions otherwise tending to pull the ground line out of driven contact with the sheaves the hooks advance along the guide track 24) progressively increases in a widening spiral around the hauler sheave until the hook guide 24 merges into a straight path section approaching the stowage guide track 20A. This is shown best in FIG. 1 wherein it will be seen that the hook guide 24 is nearly tangential to the hauler sheave periphery where the ground line passes through the bristles of the orienting brush 22 and into engagement with the hauler sheave. Near the point where the ground line g is drawn by the roller set 18 from the hauler sheave, the hook guide 24 lies at a distance out from the axis of the hauler sheave that has increased to approximately twice the radius of the latter.

Transfer rollers 18 include a lower driven roller 18A and an upper undriven roller 18B pressed by gravity down against it. These elongated, parallel rollers jacketed by soft rubber are cantilever-mounted by corresponding ends opposite their ends nearest the guide tracks 24 and 20A. The upper roller 18B is mounted on a hinged support 18C with a hinge axis offset from the roller axis in the direction toward the hauler sheave 16 and with such hinge axis parallel to the roller axis. Thus, large knots and tangles are allowed to pass readily through the roller nip by causing the upper roller to rise while maintaining its parallel relationship with the lower roller. The axes of the rollers and of the elongated nip between them extend at a downward slope angle of approximately 20° (FIG. 3) from their mounted base ends and they are also angled in the direction of ground line advancement along the guide tracks 24 and 20A at an angle of approximately 20° to the common vertical plane of those tracks (FIG. 1). Thus, with the ground line following a normal (right angle) approach direction to the transfer rolls from the hauler sheave 16, as it tends to do when not pulled laterally lengthwise of such rolls, the ground line tends to locate itself midway between the ends of the transfer rolls and to pull the ground line from the sheave groove at a location approximately 180° around the hauler sheave from its initial point of tangential incidence and entry of the hauler sheave groove (FIG. 1). This 180° of wrap maintains the necessary drive traction to haul in the longline. The hauler sheave 16 itself is mounted on its motor drive unit 62 on top of the base pedestal 60. While the details are omitted, it will be understood that a suitable or conventional variable-speed control for the sheave drive permits starting, stopping and varying the drive speed of sheave 16 as operating conditions require. The drive motor unit 18D, which turns the lower transfer roller 18A, is preferably operated by a suitable or conventional control (not shown) so as to tend to turn the lower roller at a surface speed somewhat higher than the surface speed of the hauler sheave 16 and thereby pull the ground line steadily from the sheave groove. However, the conventional drive motor unit 18D should have a suitable or conventional torque limiter (or have inherently limited torque) so that, in the event the ground line remains wedged in the hauler sheave groove, slippage of the transfer rolls on the ground line will not cause undue scouring and wear of the roll surfaces. In that event, continued rotation of the hauler sheave will cause the line splitter 70 to force the ground line out of the hauler sheave groove.

Rollers 18A and 18B are mounted on support shafts 18A' and 18B', the common plane of which is not vertical but is angled to the vertical so that the nip between the rollers is inclined downwardly. It thereby thrusts the line at a downward incline from the rollers (FIG. 5). A convex cowl 18F extends downwardly across the input face of the upper roller 18B toward the vicinity of the roll nip in a convergence which helps guide longline components into the nip, particularly should there be gangions that have hooks not entrained by the guide track 24. This thereby insures that those hooks enter smoothly into the nip between the transfer rolls. At the discharge side of the nip there is also preferably provided a pair of curved and mutually divergent guide panels 18G and 18H which are mounted together on a common support 18K so as to pivot on an axis adjacent and parallel to the discharge side of the transfer roll nip. By manual adjustment using control handle 18L, these guides provide a flared extended exit guide means from the transfer rolls that may be angled in a vertical plane to vary the casting effect of the rollers on the ground line emerging from them at different stages in the haul, at different hauling speeds, or with different lines so as to optimize the pattern of accumulation of ground line coils and loops in the stowage bin 20 during the hauling process.

As will be noted, the stowage bin 20 is mounted on a base platform structure 70. It is removable therefrom and may be replaced by a succeeding bin once it becomes full. The mounting structure 70 is so positioned that the hook receptacle track 20A on the upper edge of the bin 20 is aligned with the downwardly sloping terminal end portion of the guide track 24, such terminal end portion being designated 24A (FIG. 2).

With the hooks nested in successive order on the hook stowage track 20A of the bin 20 and with the loops and coils of ground line left undisturbed as cast into the stowage bin by the roller set 18, the accumulated longline thereby stowed is ready for maintenance inspection of the hooks and gangions in a conveniently accessible way and is also ready for resetting of the ground line in connection resetting apparatus not here described.

In lieu of stowing the ground line with gangions in a bin as shown, it will be evident that the lengths of ground line, being on the gangions, could be suspended in the open, hung on racks carrying the hooks or confined laterally in a suitable enclosure.

These and other aspects of the invention including possible design variations thereof will be evident to the skilled artisan and are intended to be included within the scope of the claims hereinafter set forth.

The embodiments of the invention in which an exclusive property or privilege is claimed are defined as follows:

1. Apparatus for stowing longline, said longline including a ground line and successively spaced gangions thereon having hooks on the gangions, said apparatus being operable to stow said long line for resetting while hauling such longline, said apparatus comprising longline stowage means including line-dispensing stowage container means adjoined by hook dispensing track means defining a final portion of a hook advancement path and adapted to receive and slidably retain hooks advancing successively into stacked relationship thereon during stowing of the longline in the container means, longline hauler means including a power-driven sheave operable to engage and advance the incoming ground line along an initial portion of said path of advancement toward said container means, means guiding the ground line in relation to such sheave to establish an arc of tractional engagement of the ground line with said sheave, said hauler means including a hook control means with a guide track defining an initial portion of said hook advancement path, said hook control means being adapted to receive and guide the hooks drawn along said guide track by such ground line advancement, and longline transfer means interposed between said hauler means and said stowage means, said transfer means comprising elongated, mutually parallel, substantially cylindrical coacting line gripping rollers, mounting means supporting such rollers one above the other and extending generally horizontally across said final portion of said ground line advancement path, power drive means for rotating at least one of said rollers to draw and advance the ground line transversely through the nip of the rollers intermediate the ends thereof, the nip of the rollers being open at their ends opposite said mounting means to pass the gangions stretched between the advancing longline and the hooks being drawn by their respective gangions along said hook advancement path, said apparatus further including means to guide the hooks to pass successively from said hauler means guide track to said hook dispensing track means.

2. The apparatus defined in claim 1, wherein the mounting means positions the rollers with at least one of the rollers cantilevered, and with the rollers extending at a decline toward the hook-dispensing track means.

3. The apparatus defined in claims 1 or 2, wherein the axis of the upper roller is offset horizontally in the direction of ground line advancement from the vertical plane containing the axis of the lower roller.

4. The apparatus defined in claims 1 or 2, wherein the axis of the upper roller is offset horizontally in the direction of ground line advancement from the vertical plane containing the axis of the lower roller wherein the lower roller is power driven, said roller mounting means movably mounting the upper roller normally to press downwardly against the lower roller and to permit upward yielding thereof from the lower roller to accommodate line knots passing through the nip.

5. The apparatus defined in claims 1 or 2, wherein the axis of the upper roller is offset horizontally in the direction of ground line advancement from the vertical plane containing the axis of the lower roller, said roller mounting means comprising an elongated hinged arm positioning the upper roller normally to press downwardly against the lower roller, the hinge axis of said arm being substantially parallel to the axis of said upper roller and offset horizontally therefrom.

6. The apparatus defined in claims 1 or 2, wherein, in plan, the stowage means hook dispensing track means is substantially straight and the hauler means guide track follows a curve of progressively increasing radius substantially straightening into alignment with the stowage means hook dispensing track in a common vertical plane.

7. The apparatus defined in claims 1 or 2, wherein the lower roller is power driven, said roller mounting means movably mounting the upper roller normally to press downwardly against the lower roller and to permit upward yielding thereof from the lower roller to accommodate line knots passing through the nip and wherein, in plan, the stowage means hook-dispensing track means is substantially straight and the hauler means guide track follows a curve of progressively increasing radius substantially straightening into alignment with the stowage means guide track in a common vertical plane, said roller mounting means supporting the rollers with the nip thereof, in plan, angled in the direction of advancement of the ground line toward the stowage means.

8. The apparatus defined in claims 1 or 2, wherein the lower roller is power driven, said roller mounting means movably mounting the upper roller normally to press downwardly against the lower roller and, to permit upward yielding thereof from the lower roller to accommodate line knots passing through the nip and wherein, in plan, the stowage means hook guide track is substantially straight and the hauler means guide track follows a curve of progressively increasing radius substantially straightening into alignment with the stowage means guide track, said roller mounting means supporting the rollers with the nip thereof, in plan, angled in the direction of advancement of the ground line toward the stowage means, said hook advancement path in elevation being turned downward along a decline that commences at a level above the level of the lower end of said roller nip and continues down into said stowage means to a level below that of the lower end of said roller nip.

9. The apparatus defined in claims 1 or 2, said roller mounting means movably mounting the upper roller to permit upward yielding thereof from the lower roller to accommodate line knots and masses passing through the roller nip.

10. The apparatus defined in claims 1 or 2, said roller mounting means movably mounting the upper roller to permit upward yielding thereof from the lower roller to accommodate line knots and masses passing through the roller nip, said roller mounting means comprising an elongated hinged arm positioning the upper roller normally to press downwardly against the lower roller, the hinge axis of said arm being substantially parallel to the axis of said upper roller and offset horizontally therefrom.

11. The apparatus defined in claims 1 or 2, said roller mounting means movably mounting the upper roller to permit upward yielding thereof from the lower roller to accommodate line knots and masses passing through the roller nip, said roller mounting means comprising an elongated hinged arm positioning the upper roller normally to press downwardly against the lower roller, the hinge axis of said arm being substantially parallel to the axis of said upper roller and offset horizontally therefrom and wherein, in plan, the stowage means hook dispensing track is substantially straight and the hauler means guide track follows a curve of progressively increasing radius substantially straightening into alignment with the stowage means guide track.

12. The apparatus defined in claims 1 or 2, said roller mounting means movably mounting the upper roller to permit upward yielding thereof from the lower roller to accommodate line knots and masses passing through the roller nip, said roller mounting means comprising an elongated hinged arm positioning the upper roller normally to press downwardly against the lower roller, the hinge axis of said arm being substantially parallel to the axis of said upper roller and offset horizontally therefrom and wherein, in plan, the stowage means hook dispensing track is substantially straigth and the hauler means guide track follows a curve of progressively increasing radius substantially straightening into alingment with the stowage means guide track, said roller mounting means supporting the rollers with the nip thereof, in plan, angled in the direction of advancement of the ground line toward the stowage means.

13. The apparatus defined in claims 1 or 2, said roller mounting means movably mounting the upper roller to permit upward yielding thereof from the lower roller to accommodate line knots passing through the roller nip, said roller mounting means comprising an elongated hinged arm positioning the upper roller normally to press downwardly against the lower roller, the hinge axis of said arm being substantially parallel to the axis of said upper roller and offset horizontally therefrom, and wherein, in plan, the stowage means hook dispensing track is substantially straight and the hauler means guide track follows a curve of progressively increasing radius substantially straightening into alignment with the stowage means guide track, said roller mounting means supporting the rollers with the nip thereof, in plan, angled in the direction of advancement of the ground line toward the stowage means, said hook advancement path in elevation turning downward along a decline that commences at a level above the level of the lower end of said roller nip and continues down into said stowage means to a level below that of the lower end of said roller nip.

14. The apparatus defined in claims 1 or 2, wherein the mounting means positions the rollers with the nip thereof, in plan, angled in the direction of advancement of the ground line toward the stowage means.

15. The apparatus defined in claims 1 or 2, wherein the mounting means positions the rollers with the nip thereof, in plan, angled in the direction of advancement of the ground line toward the stowage means, and wherein the axis of the upper roller is offset horizontally from the vertical plan containing the axis of the lower roller in the direction of ground line advancement.

16. The apparatus defined in claims 1 or 2, wherein the mounting means positions the rollers with the nip thereof, in plan, angled in the direction of advancement of the ground line toward the stowage means; and wherein the axis of the upper roller is offset horizontally from the vertical plane containing the axis of the lower roller in the direction of ground line advancement, said hook advancement path in elevation turning downward along a decline that commences at a level above the level of the lower end of said roller nip and continues down into said stowage means to a level below that of the lower end of said roller nip.

17. The apparatus defined in claims 1 or 2, wherein a ground line receiving groove of the sheave is formed by upper and lower flanges, the upper of which has a materially larger diameter than the lower.

18. The apparatus defined in claims 1 or 2, wherein a ground line receiving groove of the sheave is formed by upper and lower flanges, the upper of which has a materially larger diameter than the lower, and means extending circumferentially around the sheave and providing a generally horizontal table surface extending radially outward from the lower flange substantially to the hook control means guide track to slidably support gangions and any hooks missing such latter guide track.

19. The apparatus defined in claims 1 or 2, wherein a ground line receiving groove of the sheave is formed by upper and lower flanges, the upper of which has a materially larger diameter than the lower, and table means extending circumferentially around the sheave and radially outward from the lower flange to an outer edge comprising the hook control means guide track.

20. Apparatus for stowing longline for resetting while hauling such longline, said longline including a ground line, said apparatus comprising longline stowage means including hook dispensing track means defining a final portion of a hook advancement path and adapted to receive and slidably retain hooks advancing successively into stacked relationship thereon during stowing of the longline, longline hauler means operable to engage and advance the incoming ground line along an initial portion of said path of advancement toward said stowage means, said hauler means including a hook control means with a guide track defining an initial portion of said hook advancement path, said hook control means being adapted to receive and guide the hooks drawn along said guide track by such ground line advancement, and longline transfer means interposed between said hauler means and said stowage means, said transfer means comprising elongated, mutually parallel, substantially cylindrical coacting line gripping rollers, mounting means supporting such rollers one above the other extending generally horizontally across said final portion of said ground line advancement path, power drive means for rotating at least one of said rollers to draw and advance the ground line transversely through the nip of the rollers intermediate the ends thereof, the nip of the rollers being open at their ends opposite said mounting means to pass the gangions stretched between the advancing longline and the hooks being drawn by their respective gangions along said hook advancement path, said apparatus further including means to guide the hooks to pass successively from said hauler means guide track to said hook dispensing track means.

21. The apparatus defined in claim 20, wherein the mounting means positions the rollers with at least one of the rollers cantilevered, and with the rollers extending at a decline toward the hook-dispensing track means.

22. The apparatus defined in claims 20 or 21, wherein the axis of the upper roller is offset horizontally in the direction of ground line advancement from the vertical plane containing the axis of the lower roller.

23. The apparatus defined in claims 20 or 21, wherein the axis of the upper roller is offset horizontally in the direction of ground line advancement from the vertical plane containing the axis of the lower roller wherein the lower roller is power driven, said roller mounting means movably mounting the upper roller normally to press downwardly against the lower roller and to permit upward yielding thereof from the lower roller to accommodate line knots passing through the nip.

24. The apparatus defined in claims 20 or 21, wherein the stowage means hook dispensing track is substantially straight and the hauler means guide track follows a curve of progressively increasing radius substantially straightening and continuing into alignment with the stowage means hook dispensing track.

25. The apparatus defined in claims 20 or 21, wherein the lower roller is power driven, said roller mounting means movably mounting the upper roller normally to press downwardly against the lower roller and to permit upward yielding thereof from the lower roller to accommodate line knots passing through the nip, and wherein, in plan, the stowage means hook dispensing track is substantially straight and the hauler means guide track follows a curve of progressively increasing radius substantially straightening and continuing into alignment with the stowage means hook dispensing track, said roller mounting means supporting the rollers with the nip thereof, in plan, angled in the direction of advancement of the ground line toward the stowage means.

26. The apparatus defined in claims 20 or 21, wherein, in plan, the stowage means hook dispensing track is substantially straight and the hauler means guide track follows a curve of progressively increasing radius substantially straightening and continuing into alignment with the stowage means hook dispensing track, said roller mounting means supporting the rollers with the nip thereof, in plan, angled in the direction of advancement of the ground line toward the stowage means, said hook advancement path in elevation being turned downward along a decline that commences at a level above the level of the lower end of said roller nip and continues down into said stowage means to a level below that of the lower end of said roller nip.

27. The apparatus defined in claims 1, 2 or 14, wherein the roller mounting means supports the rollers with the nip thereof angled in the direction of advancement of the ground line toward the stowage means.

28. The apparatus defined in claims 1, 2 or 20 including brush means extending along said hauler hook control means guide track to said hook-dispensing guide track with flexible bristles projecting generally horizontally substantially into contact with such track to yieldably resist and thereby stabilize advancement of the hooks along such track.

29. The apparatus defined in claims 1, 2 or 20, wherein, in plan, the stowage means hook dispensing track is substantially straight and the hauler means guide track follows a curve of progressively increasing radius substantially straightening into alignment with the stowage means hook dispensing track.

30. The apparatus defined in claims 1 or 14, wherein the rollers have soft rubber-like surfaces and the power drive for the driven roller tends to rotate the driven roller at a surface speed faster than the ground line advancement speed of the hauler means and applies torque to such roller limited so as to limit slippage of such rollers and to limit tension produced in the ground line by such rollers.

31. The apparatus defined in claims 1 or 14, wherein the rollers have soft rubber-like surfaces and the power drive for the driven roller tends to rotate the driven roller at a surface speed faster than the ground line advancement speed of the hauler means and applies torque to such roller limited so as to limit slippage of such rollers and to limit tension produced in the ground line by such rollers, and wherein the mounting means positions the rollers with at least one of the rollers cantilevered, and with the rollers extending at a decline toward the hook-dispensing track means.

32. The apparatus defined in claims 1 or 14, wherein the rollers have soft rubber-like surfaces and the power drive for the driven roller tends to rotate the driven roller at a surface speed faster than the ground line advancement speed of the hauler means and applies torque to such roller limited so as to limit slippage of such rollers and to limit tension produced in the ground line by such rollers, and wherein the mounting means positions the rollers with at least one of the rollers cantilevered, and with the rollers extending at a decline toward the hook-dispensing track means, and wherein the axis of the upper roller is offset horizontally in the direction of ground line advancement from the vertical plane containing the axis of the lower roller.

33. The apparatus defined in claims 1 or 14, wherein the rollers have soft rubber-like surfaces and the power drive for the driven roller tends to rotate the driven roller at a surface speed faster than the ground line advancement speed of the hauler means and applies torque to such roller limited so as to limit slippage of such rollers and to limit tension produced in the ground line by such rollers, wherein the mounting means positions the rollers with at least one of the rollers cantilevered, and with the rollers extending at a decline toward the hook-dispensing track means, wherein the axis of the upper roller is offset horizontally in the direction of ground line advancement from the vertical plane containing the axis of the lower roller, and wherein the axis of the upper roller is offset horizontally in the direction of ground line advancement from the vertical plane containing the axis of the lower roller, said lower roller being power driven, and said roller mounting means movably mounting the upper roller normally to press downwardly against the lower roller and to permit upward yielding thereof from the lower roller to accommodate line knots passing through the nip.

34. The apparatus defined in claims 1 or 14, wherein the rollers have soft rubber-like surfaces and the power drive for the driven roller tends to rotate the driven roller at a surface speed faster than the ground line advancement speed of the hauler means and applies torque to such roller limited so as to permit slippage of such rollers and to limit tension produced in the ground line by such rollers, wherein the mounting means positions the rollers with at least one of the rollers cantilevered and with the rollers extending at a decline toward the hook dispensing track means, wherein the axis of the upper roller is offset horizontally in the direction of ground line advancement from the vertical plane containing the axis of the lower roller, said roller being power driven, and said roller mounting means movably mounting the upper roller normally to press downwardly against the lower roller and to permit upward yielding thereof from the lower roller to accommodate line knots passing through the nip, said roller mounting means supporting the rollers with the nip thereof, in plan, angled in the direction of advancement of the ground line toward the stowage means.

35. The apparatus defined in claims 1 or 14, and hook control means operable to orient hooks to engage the hook control means guide track along their approach toward the hauler means, said hook control means comprising flexible bristle brush means and an opposing surface, comprising said guide track, against which the brush presses the passing ground line and gangions along such approach to produce drag and to rotate the hooks thereon.

36. The apparatus defined in claims 1 or 14, and hook control means operable to orient hooks to engage the hook control means guide track along their approach toward the hauler means, said hook control means comprising flexible bristle brush means and an opposing surface comprising said guide track against which the brush presses the passing ground line and gangions along such approach to produce drag and to rotate the hooks thereon, said brush means having bristles projecting downwardly into engagement with the passing ground line and gangions, the brush having bristles first encountered by the passing ground line and gangions which project downwardly past the level of said opposing surface and which are offset therefrom against the direction of line advancement.

37. The apparatus defined in claims 1 or 14, including an entrance guide through which the ground line and gangions pass, followed by at least one set of opposing brushes with bristles projecting into intermeshing relationship past a median plane between the brushes and through which the ground line and gangions pass after passing said entrance guide.

38. The apparatus defined in claims 1 or 14, including an entrance guide through which the ground line and gangions pass, followed by at least one set of opposing brushes with bristles projecting into intermeshing relationship past a median plane between the brushes and through which the ground line and gangions pass after passing said entrance guide, said brushes being positioned with said median plane being transversely offset from a ground line passing centrally through the entrance guide.

39. The apparatus defined in claims 1 or 14, including an entrance guide through which the ground line and gangions pass, followed by at least one set of opposing brushes with bristles projecting into intermeshing relationship past a median plane between the brushes and through which the ground line and gangions pass after passing said entrance guide, said brushes being positioned with said median plane being transversely offset from a ground line passing centrally through the entrance guide, and a further brush having bristles projecting into rubbing engagement with one side of the ground line passing said set of brushes, the apparatus providing open space opposite said further brush to permit unravelling of gangions contacted thereby.

40. Apparatus for stowing longline for resetting while hauling such longline, said longline including a ground line and gangions, said apparatus comprising longline stowage means including hook dispensing means defining a final portion of an advancement path and adapted to receive and retain hooks advancing successively thereon during stowing of the longline, longline hauler means operable to engage and advance the incoming ground line along an initial portion of said advancement path toward said stowage means, said hauler means including a hook control means with a guide track defining an initial portion of said advancement path, said hook control means operable to orient hooks to engage the guide track along their approach toward the hauler means, said hook control means comprising flexible bristle brush means and an opposing surface including said guide track against which the brush means presses both the passing ground line and gangions along their approach toward said hauler means to produce drag and to rotate the hooks thereon so that said hooks engage said guide track as they are advanced along said advancement path.

41. Apparatus for stowing longline for resetting while hauling such longline, said longline including a ground line, said apparatus comprising longline stowage means including hook-dispensing retainer means defining a final portion of a hook advancement path and adapted to receive and retain hooks advanced successively thereon during hauling and stowing of the longline, longline hauler means operable to engage and advance the incoming ground line along an initial portion of said path defined by a free stretch of ground line followed by a further stretch of ground line advancing through said hauler means, a hook guide track having an initial portion intersected at an acute angle by said free stretch of ground line and continuing thereafter along said further stretch of ground line, hook control means for orienting and stabilizing hooks on gangions drawn by the ground line across said guide track to effect engagement of the hooks with said guide track, said hook control means comprising brush means with a first array of freely projecting flexible bristles through the midst of which the ground line, gangions and hooks pass in a direction transverse to the projecting lengths of the bristles in the final approach of the gangions and hooks to the guide track so as to produce drag thereon and thereby to rotatively orient the hooks to engage the guide track, said brush means having a second array of freely projecting bristles substantially parallel to those in the first array and projecting with their tips pressing the ground line and gangions against the guide track as they pass intersectingly across the same.

42. The apparatus defined in claim 41 wherein the further stretch of ground line path of advancement is defined by the periphery of a hauler sheave engaged by the ground line and rotating in a substantially horizontal plane, the bristles of the brush means projecting downwardly substantially vertically.

43. The apparatus defined in claims 41 or 42 and further brush means extending along the guide track and with bristles projecting freely against the same along said further stretch of ground line so as to drag upon and further stabilize the hooks advancing along said guide track.

* * * * *

UNITED STATES PATENT AND TRADEMARK OFFICE
CERTIFICATE OF CORRECTION

PATENT NO. : 4,505,062

DATED : March 19, 1985

INVENTOR(S) : Harold T. Cook, Jr.

It is certified that error appears in the above-identified patent and that said Letters Patent is hereby corrected as shown below: On the title page;

Abstract, line 6, "longlines" should be --longline's--

Column 2, line 52, "to" (first occurrence) should be --so-- line 58, "rimedge" should be --rim-edge--

Column 12, line 33, "14" should be --20--
(Cl. 27, line 1)
Column 12, line 50, "14" should be --20--
(Cl. 30, line 1)
Column 12, line 58, "14" should be --20--
(Cl. 31, line 1)
Column 13, line 1, "14" should be --20--
(Cl. 32, line 1)
Column 13, line 15, "14 should be --20--
(Cl. 33, line 1)

UNITED STATES PATENT AND TRADEMARK OFFICE
CERTIFICATE OF CORRECTION

PATENT NO. : 4,505,062

DATED : March 19, 1985

INVENTOR(S) : Harold T. Cook, Jr.

It is certified that error appears in the above-identified patent and that said Letters Patent is hereby corrected as shown below:

Column 13, line 37, "14" should be --20--
(Cl. 34, line 1)
Column 13, line 60, "14" should be --20--
(Cl. 35, line 1)
Column 14, line 1, "14" should be --20--
(Cl. 36, line 1)
Column 14, line 16, "14" should be --20--
(Cl. 37, line 1)
Column 14, line 23, "14" should be --20--
(Cl. 38, line 1)
Column 14, line 33, "14" should be --20--
(Cl. 39, line 1)

Signed and Sealed this

Eighth Day of October 1985

[SEAL]

Attest:

*Attesting Officer*

DONALD J. QUIGG

*Commissioner of Patents and Trademarks—Designate*